(12) United States Patent
Zhu

(10) Patent No.: US 11,882,319 B2
(45) Date of Patent: Jan. 23, 2024

(54) VIRTUAL LIVE VIDEO STREAMING METHOD AND APPARATUS, DEVICE, AND READABLE STORAGE MEDIUM

(71) Applicant: Tencent Technology (Shenzhen) Company Limited, Shenzhen (CN)

(72) Inventor: Shaoming Zhu, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/955,951

(22) Filed: Sep. 29, 2022

(65) Prior Publication Data

US 2023/0023085 A1  Jan. 26, 2023

Related U.S. Application Data

(63) Continuation of application No. PCT/CN2021/122658, filed on Oct. 8, 2021.

(30) Foreign Application Priority Data

Oct. 30, 2020 (CN) .......................... 202011186517.6

(51) Int. Cl.
*H04N 21/2187* (2011.01)
*G06T 13/40* (2011.01)
*H04N 21/488* (2011.01)

(52) U.S. Cl.
CPC ......... *H04N 21/2187* (2013.01); *G06T 13/40* (2013.01); *H04N 21/4884* (2013.01)

(58) Field of Classification Search
CPC .... G06F 40/279; G06F 16/685; G06F 16/738; G06F 40/30; G06T 13/40; G06T 13/80;
(Continued)

(56) References Cited

U.S. PATENT DOCUMENTS

2011/0099195 A1* 4/2011 Patwardhan .......... G06F 16/738
707/769
2016/0078349 A1* 3/2016 Byron ..................... G06F 40/30
706/55
(Continued)

FOREIGN PATENT DOCUMENTS

CN 106653052 A 5/2017
CN 107998658 A 5/2018
(Continued)

OTHER PUBLICATIONS

Office Action with English Translation of Concise Explanation of Relevance for Chinese Patent Application No. 202011186517.6 dated Apr. 24, 2023, 8 pages.
(Continued)

*Primary Examiner* — Le H Luu
(74) *Attorney, Agent, or Firm* — Crowell & Moring LLP

(57) ABSTRACT

This application discloses a virtual live streaming method and apparatus, a device, and a storage medium. The method includes: acquiring a live text content which is a text content broadcast by voice by a virtual character in a virtual live stream; segmenting the live text content to obtain text segments that are sequentially arranged; acquiring a live broadcast data packet of each of the text segments following a sequence of the text segments, the live broadcast data packet comprising mouth shape data corresponding to the each of the text segments and being used for determining a mouth shape of the virtual character corresponding to the text segment; and performing screen rendering based on the live broadcast data packet to obtain a live screen for the virtual live streaming, the live screen comprising the virtual character who expresses the each of the text segments with a corresponding mouth shape.

20 Claims, 6 Drawing Sheets

(58) Field of Classification Search
CPC ......... G06T 17/20; H04L 65/75; H04L 51/02; H04N 21/2187; H04N 21/234336; H04N 21/4312; H04N 21/44012; H04N 21/4884; H04N 21/8146; H04N 21/816; H04N 21/8456; H04N 21/854; A63F 13/63; G06N 3/08; G06V 40/16; G10L 13/08; G10L 15/063; G10L 15/26; G10L 21/10

See application file for complete search history.

(56) References Cited

U.S. PATENT DOCUMENTS

| | | | |
|---|---|---|---|
| 2018/0032611 A1* | 2/2018 | Cameron | G06F 16/685 |
| 2018/0088791 A1 | 3/2018 | Kim et al. | |
| 2019/0392823 A1* | 12/2019 | Li | G10L 15/063 |
| 2020/0051305 A1* | 2/2020 | Zelenin | A63F 13/63 |
| 2020/0126283 A1* | 4/2020 | van Vuuren | G06T 17/20 |
| 2020/0410731 A1* | 12/2020 | Chen | G10L 13/08 |
| 2021/0044640 A1* | 2/2021 | He | G10L 15/26 |
| 2021/0192824 A1* | 6/2021 | Chen | H04L 51/02 |
| 2021/0366173 A1* | 11/2021 | Sinha | G06V 40/16 |
| 2021/0390748 A1* | 12/2021 | Liao | G06N 3/08 |
| 2022/0101871 A1* | 3/2022 | Xu | G10L 21/10 |
| 2022/0108510 A1* | 4/2022 | Sagar | G06T 13/80 |

FOREIGN PATENT DOCUMENTS

| | | |
|---|---|---|
| CN | 109637518 A | 4/2019 |
| CN | 110136698 A | 8/2019 |
| CN | 111010589 A | 4/2020 |
| CN | 112333179 A | 2/2021 |

OTHER PUBLICATIONS

International Search Report and Written Opinion with English Translation for International Patent Application No. PCT/CN2021/122658 dated Jan. 12, 2022, 13 pages.

* cited by examiner

VIRTUAL LIVE VIDEO STREAMING METHOD AND APPARATUS, DEVICE, AND READABLE STORAGE MEDIUM

RELATED APPLICATION

This application is a continuation application of PCT Patent Application No. PCT/CN2021/122658, filed on Oct. 8, 2021, which claims priority to Chinese Patent Application No. 202011186517.6, filed with the China National Intellectual Property Administration on Oct. 30, 2020, each of which is incorporated herein by reference in its entirety.

FIELD OF THE TECHNOLOGY

Embodiments of this application relate to the field of virtual live streaming, and particularly to a virtual live video streaming method and apparatus, a device, and a readable storage medium.

BACKGROUND OF THE DISCLOSURE

Virtual live video streaming (or virtual live streaming) refers to simulating real voices and real actions for live streaming by a virtual anchor as a live streaming body. The combination of live video streaming and artificial intelligence (AI) may play a role in many scenarios, such as implementing virtual news broadcasting instead of a real person and implementing virtual game commentating instead of a game anchor.

In the related art, in virtual video pushing, a video stream corresponding to a live streaming process is usually created directly in an animation form, and an audio stream is acquired, so as to push the audio stream and the video stream to a player for playing during pushing.

However, this method is based on stable audio and video data and inapplicable to a dynamic scenario that new data is generated in real time during live streaming. As a result, the real-time performance of virtual live streaming is relatively poor.

SUMMARY

The embodiments of this disclosure provide a virtual live video streaming method and apparatus, a device, and a readable storage medium, which may quicken the response of virtual live video streaming, and improve the real-time performance of a live video. The technical solutions are as follows:

An aspect provides a virtual live video streaming method, applied to a computer device, the method including:
  acquiring a live text content, the live text content being a text content broadcast by voice by a virtual character in a virtual live stream;
  segmenting the live text content to obtain text segments that are sequentially arranged;
  acquiring sequentially live data packets of the text segments, the live data packet including mouth shape data corresponding to the text segment, and the mouth shape data being used for determining a mouth shape representation of the virtual character corresponding to the text segment; and
  performing screen rendering based on the live data packet to obtain a live screen for virtual live streaming by pushing, the live screen including the virtual character who expresses the text segment with the mouth shape representation.

A further aspect provides a virtual live video streaming method, applied to a computer device, the method including:
  displaying a live streaming interface, the live streaming interface being used for playing a virtual live stream, and the virtual live stream including a virtual character;
  receiving a text generation operation, the text generation operation being used for generating a live text content, and the live text content being a text content broadcast by voice by the virtual character in the virtual live stream; and
  displaying a live screen on the live streaming interface based on the text generation operation, the live screen including the virtual character, and a mouth shape representation of the virtual character corresponding to the live text content.

A further aspect provides a virtual live video streaming apparatus, including:
  an acquisition module, configured to acquire a live text content, the live text content being a text content broadcast by voice by a virtual character in a virtual live stream;
  a processing module, configured to segment the live text content to obtain text segments that are sequentially arranged,
  the acquisition module being further configured to acquire sequentially live data packets of the text segments, the live data packet including mouth shape data corresponding to the text segment, and the mouth shape data being used for determining a mouth shape representation of the virtual character corresponding to the text segment; and
  a rendering module, configured to render the live data packet to obtain a live screen for virtual live streaming by pushing, the live screen including the virtual character who expresses the text segment with the mouth shape representation.

A further aspect provides a virtual live video streaming apparatus, including:
  a display module, configured to display a live streaming interface, the live streaming interface being used for playing a virtual live stream, and the virtual live stream including a virtual character; and
  a receiving module, configured to receive a text generation operation, the text generation operation being used for generating a live text content, and the live text content being a text content broadcast by voice by the virtual character in the virtual live stream,
  the display module being further configured to display a live screen on the live streaming interface based on the text generation operation, the live screen including the virtual character, and a mouth shape representation of the virtual character corresponding to the live text content.

According to another aspect, a computer device is provided, including a processor and a memory, the memory storing at least one instruction, at least one segment of program, a code set, or an instruction set, the at least one instruction, the at least one segment of program, the code set, or the instruction set being loaded and executed by the processor to implement the virtual live video streaming method according to any one of the foregoing embodiments of this disclosure.

According to another aspect, a non-transitory computer-readable storage medium is provided, storing at least one instruction, at least one segment of program, a code set, or an instruction set, the at least one instruction, the at least one segment of program, the code set, or the instruction set being loaded and executed by a processor to implement the virtual live video streaming method according to any one of the foregoing embodiments of this disclosure.

According to another aspect, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and executes the computer instructions, to cause the computer device to implement the foregoing virtual live video streaming method according to any one of the foregoing embodiments of this disclosure.

The technical solutions provided in the embodiments of this disclosure produce at least the following beneficial effects:

A long live text content is segmented into multiple short text segments, then live data packets (e.g., love broadcast data packets) of the multiple short text segments are acquired sequentially, and rendering is performed sequentially according to the live data packets of the multiple short text segments to obtain a live screen. Since the live data packets are acquired and generated sequentially according to the short text segments, the problem of relatively large delay of the live screen caused by relatively high time consumption and relatively high complexity of acquisition and rendering processes of a live data packet of a long text is solved. Since text to speech (TTS) processing, rendering, and pushing are performed serially, the response of a live video is quickened, live data may be generated flexibly in virtual live streaming, and the real-time performance of the live video is improved.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from the accompanying drawings without creative efforts.

DESCRIPTION OF EMBODIMENTS

To make the objectives, technical solutions, and advantages of this application clearer, the following further describes implementations of this application in detail with reference to the accompanying drawings.

First, terms involved in the embodiments of this disclosure are briefly introduced.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result.

The Computer Vision (CV) is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. In the embodiments of this disclosure, in virtual live video streaming, mouth shape data of a virtual anchor is generated according to a live text content, and then the mouth shape data is combined with a three-dimensional model of the virtual anchor by a three-dimensional technology to generate a live video stream.

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future. In the embodiments of this disclosure, in virtual live video streaming, audio data is generated according to a live text content as an audio produced by a virtual anchor for live streaming.

Virtual live video streaming: it refers to simulating real voices and real actions for live streaming by a virtual anchor as a live streaming body, such as implementing virtual news broadcasting instead of a real person and implementing virtual game commentating instead of a game anchor. The virtual anchor is embodied as a three-dimensional virtual character in virtual live video streaming. That is, an image of the virtual anchor in virtual live video streaming is represented in form of a three-dimensional virtual model. In virtual live video streaming, the virtual anchor may implement live streaming in a real environmental image, or in a virtual environmental image. No limits are made thereto in the embodiments of this disclosure.

Figure 1:
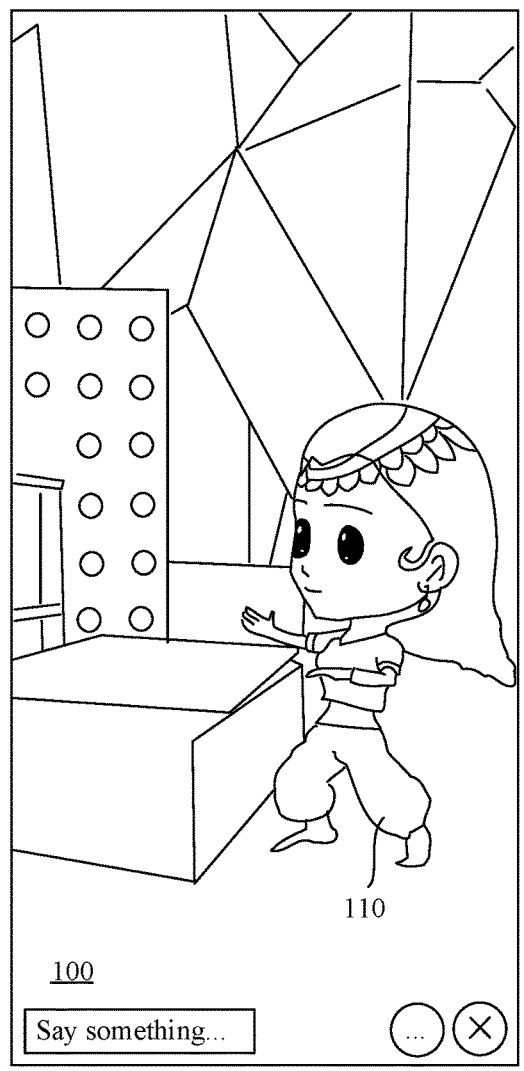
FIG. 1 is a schematic diagram of an interface for live news streaming completed by a virtual anchor independently according to an exemplary embodiment of this application.

Schematically, referring to FIG. 1, FIG. 1 is a schematic diagram of a virtual live video streaming interface according to an exemplary embodiment of this application. The virtual anchor may perform live streaming with a real anchor, or complete live streaming independently. FIG. 1 takes independent completion of live news streaming by the virtual anchor as an example. As shown in FIG. 1, a virtual anchor 110 is displayed on a live streaming interface 100, and the virtual anchor 110 is performing live news streaming according to a news manuscript. The virtual anchor 110 performs live streaming in form of a three-dimensional virtual model in a virtual or real live streaming environment.

In the related art, most live video streaming methods are for application scenarios where there are already stable audio and image data inputs (such as local video pushing) or audio and image data may be acquired rapidly (for example, a camera acquires data), etc. Depending on stable data sources makes it impossible to apply these methods well to virtual live video streaming.

The embodiments of this disclosure provide a method for reducing a virtual live video streaming delay. An input text is segmented into multiple short texts, so as to accelerate the acquisition of audio data. In addition, parallel processing is used, so that the video synthesis speed is increased, and the problems of poor real-time performance, large delay, etc., of virtual live video streaming caused by large calculation amount needed to acquire audio and video data are solved.

Figure 2:
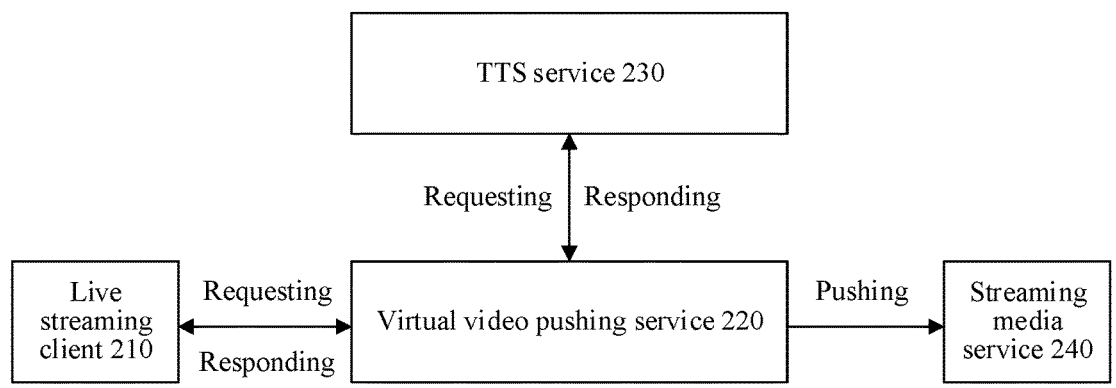
FIG. 2 is a structural block diagram of a live video streaming system according to an exemplary embodiment of this application.

FIG. 2 is a structural block diagram of a live video streaming system according to an exemplary embodiment of this application. As shown in FIG. 2, the live video streaming system includes a live streaming client 210, virtual video pushing service 220, TTS service 230, and streaming media service 240.

The live streaming client 210 acquires and transmits a live text content to the virtual video pushing service 220. The virtual video pushing service 220 segments a long text of the input live text content into multiple short texts by dynamic phrasing, and sequentially submits these short texts to the TTS service 230.

The TTS service 230 generates live data packets corresponding to the short texts according to a requesting sequence (i.e., a transmission sequence of the short texts), the live data packet including mouth shape data and audio data corresponding to the short text, and returns the live data packets to the virtual video pushing service 220. The virtual video pushing service 220 performs Three-Dimensional (3D) rendering processing on mouth shape data acquired each time to obtain an expression image of a virtual anchor capable of reflecting a mouth shape representation of the virtual anchor corresponding to the short text, and pushes the expression image and acquired audio data to the streaming media service 240 for pushing live streaming.

The service may be implemented as a service platform, or a server.

In some embodiments, when acquiring the expression image and the audio data, the streaming media service 240 pushes a live video stream to an audience client watching the virtual live stream.

The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In some embodiments, the server may be implemented as a node in a blockchain system. A blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and application service layer.

The live streaming client and the audience client run in terminals. The terminal may be, but not limited to, a smartphone, a tablet computer, a notebook computer, a desktop computer, a smart speaker, a smart watch, a smart home device, an in-vehicle terminal, etc. The terminal and the server may be directly or indirectly connected in a wired or wireless communication manner. This is not limited in this application.

Then, an application scenario involved in the embodiments of this disclosure is exemplified in combination with the above contents.

First, in a virtual live news streaming process, an anchor terminal transmits a live text content to a server in real time, and the server determines mouth shape data and audio data of a virtual anchor according to the live text content, so as to generate a live video stream by rendering based on the mouth shape data and the audio data. The mouth shape data is used for controlling the virtual anchor to broadcast a news content with a corresponding mouth shape representation. The audio data is used for representing an audio content synchronously corresponding to the mouth shape representation. Therefore, virtual live news streaming is implemented.

Second, in a live game commentating process, an anchor terminal transmits a live text content for commentating a game to a server according to a progress of the game, and the server determines mouth shape data and audio data of a virtual anchor according to the live text content, so as to generate a live video stream by rendering based on the mouth shape data and the audio data. The mouth shape data is used for controlling the virtual anchor to broadcast a commentary content of the game process with a corresponding mouth shape representation. Therefore, virtual live game streaming is implemented.

The above live news streaming and live game commentating are only schematic examples in the application scenario of this application. The virtual live video streaming method provided in the embodiments of this disclosure may also be applied to other application scenarios. No limits are made thereto in the embodiments of this disclosure.

Figure 3:
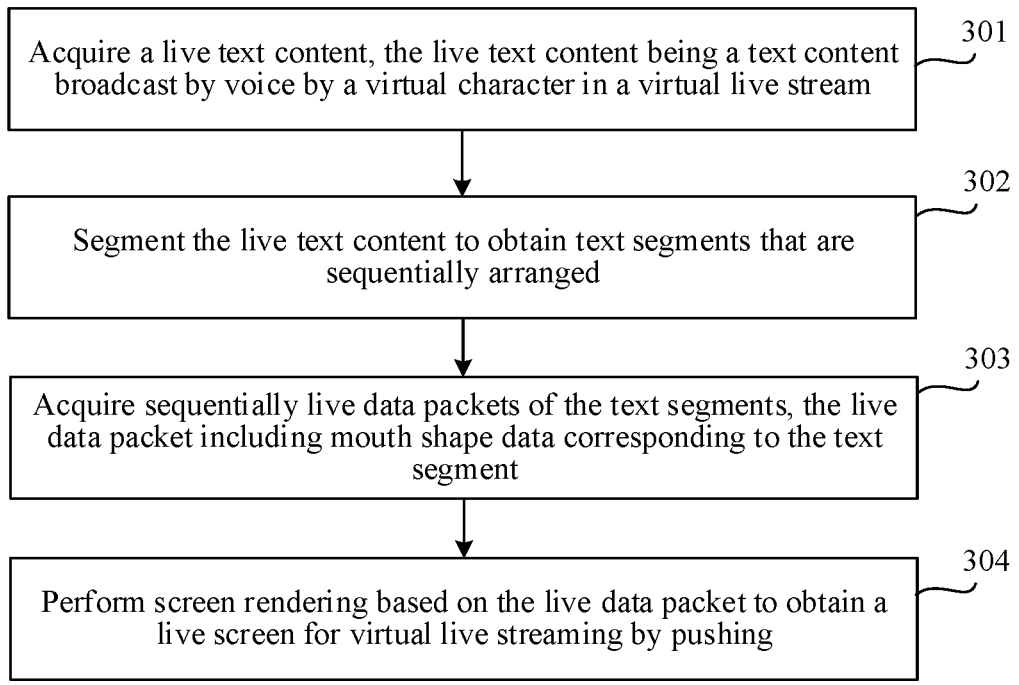
FIG. 3 is a flowchart of a virtual live video streaming method according to an exemplary embodiment of this application.

The virtual live video streaming method provided in the embodiments of this disclosure will be described in combination with the above contents. FIG. 3 is a flowchart of a virtual live video streaming method according to an exemplary embodiment of this application. The method is described with application to a server as an example. As shown in FIG. 3, the method includes the following steps:

Step 301: Acquire a live text content, the live text content being a text content broadcast by voice by a virtual character in a virtual live stream.

Optionally, the virtual character may be a virtual anchor in the virtual live stream, or a virtual guest in the virtual live stream, etc. In this embodiment of this application, descriptions are made taking the virtual character being implemented as a virtual anchor in the virtual live stream as an example.

In some embodiments, the live text content is transmitted by an anchor terminal to the server in a virtual live streaming process. Alternatively, the live text content is transmitted by a relay terminal to the server according to a live streaming progress of an anchor terminal in a virtual live streaming process. The live text content is edited in real time by the anchor terminal according to the live streaming process. Alternatively, the live text content is edited in advance in the anchor terminal and transmitted to the server by streaming in the live streaming process.

In this embodiment of this application, descriptions are made taking the live text content being edited and transmitted to the server in real time by the anchor terminal according to the live streaming process as an example. Schematically, descriptions are made taking virtual live video streaming being implemented live game commentating as an example. In a game commentating process, the anchor terminal generates a live text content according to a game process for commentating the game process, and transmits the live text content to the server.

The anchor terminal generates the live text content according to the game process in at least one of the following manners.

In a first manner, a commentator directly edits the live text content in the anchor terminal according to the game process.

Schematically, in the game commentating process, the commentator edits and transmits the live text content in real time to the server to generate a live commentating screen of the virtual anchor.

In a second manner, a commentator inputs a voice content through a microphone connected with the anchor terminal, and the anchor terminal performs speech to text processing on the voice content to obtain the live text content.

Schematically, in the game commentating process, the commentator inputs a real-time voice content according to a game screen, performs speech to text processing on the real-time voice content in the anchor terminal to obtain the live text content, and transmits the live text content to the server to generate a live commentating screen of the virtual character.

In a third manner, a commentary content is generated automatically according to a key operation in the game process, and a commentator adjusts the automatically generated commentary content to generate the live text content.

Schematically, the key operation includes at least one of the following cases. 1: In the live game streaming process, multiple preset shortcut controls are displayed on an interface of the anchor terminal, each shortcut control corresponding to a piece of preset commentary content. For example, if a commentary content corresponding to shortcut control A is "there comes the match point, wonderful", when a received touch operation over shortcut control A is a key operation, the commentary content corresponding to shortcut control A is determined as the automatically generated commentary content. 2: An interface display element in the game process is monitored, or background data in the game process is monitored, or an operation of a player in the game process is monitored, and a corresponding commentary content is generated automatically according to a key operation in a monitoring result. For example, when the background data in the game process is monitored, score data of the game player in the background data is obtained, and when the score data meets a match point requirement, a commentary content "there comes the match point, wonderful" corresponding to the match point requirement is generated automatically. The above key operations are only schematic examples. No limits are made thereto in this embodiment of this application.

After the commentary content is generated automatically, there are differences in terms of process for different game processes, so the commentator may adjust the automatically generated commentary content in real time according to a current game process. For example, the commentary content is adjusted to "the perfect cooperation of camp A brings them to the match point, wonderful".

The live text content is a content that the virtual character needs to express in the virtual live stream. That is, the virtual character needs to simulate broadcasting of the live text content in the virtual live stream, including simulating broadcasting of the live text content in terms of broadcasting mouth shape and simulating broadcasting of the live text content in terms of audio.

In some embodiments, the virtual live video streaming system includes virtual video pushing service. The anchor terminal transmits the live text content to the virtual video pushing service when transmitting the live text content to the virtual live video streaming system.

Step 302: Segment the live text content to obtain text segments that are sequentially arranged.

In order to avoid the impact of a long text on the response speed of the video, the server segments the live text content into multiple short texts, i.e., the above-mentioned text segments.

In some embodiments, the server segments the live text content according to a character sequence in the live text content to obtain multiple text segments that are sequentially arranged. An arrangement sequence of the text segments corresponds to a sequence of the text segments in the live text content. Optionally, the live text content is segmented in at least one of the following manners.

1: The live text content is segmented sequentially taking a punctuation in the live text content as a segmentation point (i.e., a delimiter) to obtain a candidate text segment, and the text segment is obtained based on a character length of the candidate text segment.

Optionally, a punctuation set is acquired, the punctuation set including a preset phrasing punctuation used as a segmentation point, and the live text content is segmented sequentially taking the phrasing punctuation in the live text content as the segmentation point to obtain the candidate text segment.

A punctuation set D for phrasing is preset in the server. When segmentation is performed to obtain a candidate text segment, segmentation is performed according to the punctuation set D. Schematically, a phrasing punctuation in the punctuation set D is matched with the punctuation in the live text content, and a position where there is the phrasing punctuation in the punctuation set D is determined as a segmentation point for obtaining the candidate text segment by segmentation.

Schematically, if the punctuation set D includes period, characters in the live text content are sequentially traversed, and when there is a period in the live text content, a position of the period is determined as a segmentation point for a candidate text segment. Therefore, a content between a starting point and a segmentation point or between two adjacent segmentation points is determined as a candidate text segment.

In some embodiments, after the candidate text segment is obtained by segmentation, whether the candidate text segment meets a requirement of the text segment is determined according to a character length of the candidate text segment. For example, the candidate text segment is determined as the text segment when the character length of the candidate text segment reaches a required length threshold.

In some embodiments, the candidate text segment is directly determined as the text segment in response to the character length of the candidate text segment reaching a first length threshold.

In response to the character length of the candidate text segment not reaching the first length threshold, the candidate text segment is stored to a segment combination region, and the candidate text segment in the segment combination region is combined with a candidate text segment subsequently obtained by segmentation to obtain the text segment.

2: The live text content is segmented taking a preset character count as a text segment length to obtain the multiple text segments.

Schematically, taking the preset character count being 10 as an example, characters in the live text content are traversed, and every time when there are 10 characters, the 10 characters are segmented from the live text content as a text segment.

3: The live text content is randomly segmented in sequence within a preset character count range. For example, if the preset character count range is 8 to 10 characters, when the live text content is segmented into text segments, one of 8, 9, and 10 is randomly selected each time for segmentation of the text segments.

The above manners for obtaining the text segments by segmentation are only schematic examples. No limits are made thereto in this embodiment of this application.

In some embodiments, the virtual live video streaming system includes virtual video pushing service. The anchor terminal transmits the live text content to the virtual video pushing service. The virtual video pushing service segments the live text content into multiple text segments that are sequentially arranged.

Optionally, the video pushing service includes a text input module. The text input module receives the live text content transmitted by the anchor terminal, and segments the live text content into multiple text segments according to a preset text segmentation rule.

Step 303: Acquire sequentially live data packets of the text segments, the live data packet including mouth shape data corresponding to the text segment. In some implementations, the live data packet may also be referred to as live broadcast data packet. In some implementations, each text segment may correspond to one live data packet. In some implementations, each text segment may correspond to multiple live data packets.

The mouth shape data is used for determining a mouth shape representation of the virtual character corresponding to the text segment. That is, the mouth shape data is used for determining a mouth shape of the virtual character when the live text content is broadcast. The live data packets of the text segments are acquired sequentially. That is, the text segments obtained by segmenting the live text content are sequentially arranged, so the live data packets are sequentially acquired according to the arrangement sequence of the text segments when the live data packets are acquired.

In some embodiments, the virtual live video streaming system includes virtual video pushing service and TTS service. The virtual video pushing service segments the live text content into multiple text segments that are sequentially arranged, and then sequentially transmits the text segments to the TTS service to acquire live data packets. The virtual video pushing service sequentially transmits the text segments to the TTS service, and after the TTS service feeds back a live data packet, continues to transmit the next text segment to the TTS service.

Schematically, the virtual video pushing service transmits a fourth text segment to the TTS after receiving a live data packet fed back by the TTS service and corresponding to a third text segment such that the TTS service performs TTS processing on the fourth text segment to obtain a fourth live data packet. After the TTS feeds back the fourth live data packet to the virtual video pushing service, the virtual video pushing service continues to transmit a fifth text segment to the TTS service, and so on.

Alternatively, the virtual video pushing service allocates serial number identifiers to the text segments, and transmits the text segments with the serial number identifiers to the TTS service. The TTS service processes the text segments from small to large serial number identifiers of the text segments to obtain the live data packets, and sequentially feeds back the corresponding live data packets to the virtual video pushing service according to magnitudes of the serial number identifiers.

Optionally, the virtual video pushing service includes a TTS request module. The TTS request module sequentially transmits the text segments to the TTS service, and receives the live data packets.

Step 304: Perform screen rendering based on the live data packet to obtain a live screen for virtual live streaming. The virtual live streaming may be implemented by pushing, and may be pushed to, for example, players, or codec applications, and the like.

The live screen includes the virtual character who expresses the text segment with the mouth shape representation.

The live data packet includes the mouth shape data corresponding to the text segment, so that a mouth shape of the virtual character is rendered based on the mouth shape data to obtain the live screen.

The live screen of the virtual live stream includes the virtual character, and the virtual character expresses the live text content with the mouth shape representation corresponding to the mouth shape data.

In some embodiments, the virtual video pushing service further includes a 3D rendering module. The TTS request module transmits the mouth shape data to the 3D rendering module after receiving the live data packet fed back by the TTS service, such that the 3D rendering module performs 3D rendering processing by combining a three-dimensional model of the virtual character to obtain an expression image of the virtual character as the live screen.

The live screen is implemented as a part of a complete live screen for pushing. Alternatively, the live screen is implemented as a direct pushing live streaming screen.

Schematically, when the live screen is implemented as a part of a complete live screen for pushing, taking the complete live screen being implemented as live streaming by a real anchor and the virtual anchor together as an example, the live screen includes a first display region corresponding to the virtual anchor, and the complete live screen further includes a second display region corresponding to the real anchor and a game screen. In such case, the first display region corresponding to the live screen is combined with the second display region corresponding to the real anchor and then with the game screen to obtain the complete live screen for live streaming.

Figure 4:
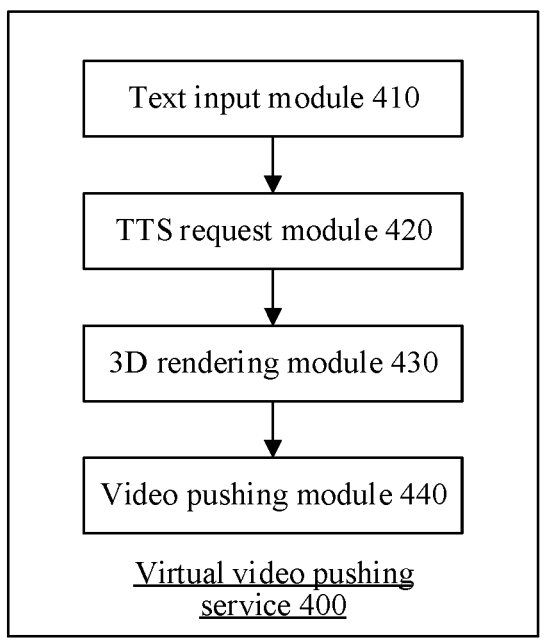
FIG. 4 is a structural block diagram of a virtual video pushing service based on the embodiment shown in FIG. 3.

Schematically, referring to FIG. 4, virtual video pushing service 400 includes a text input module 410, a TTS request module 420, a 3D rendering module 430, and a video pushing module 440.

The text input module 410 is configured to receive a live text content transmitted by an anchor terminal, and segment the live text content into multiple text segments according to a preset segmentation rule, such that the TTS request module 420 sequentially transmits the text segments obtained by segmentation to TTS service to obtain a live data packet corresponding to each text segment by TTS processing. After receiving a live data packet, the TTS request module 420 transmits the live data packet to the 3D rendering module 430. The 3D rendering module 430 performs rendering according to mouth shape data in the live data packet to obtain a live screen, and transmits the live screen to the video pushing module 440 for pushing.

In summary, according to the virtual live video streaming method provided in this embodiment, a long live text content is segmented into multiple short text segments, then live data packets of the multiple short text segments are acquired sequentially, and rendering is performed sequentially according to the live data packets of the multiple short text segments to obtain a live screen. Therefore, the problem of relatively large delay of the live screen caused by relatively high time consumption and relatively high complexity of acquisition and rendering processes of a live data packet of a long text is solved. Since TTS processing, rendering, and pushing are performed serially, the response of a live video is quickened, and the real-time performance of the live video is improved.

Figure 5:
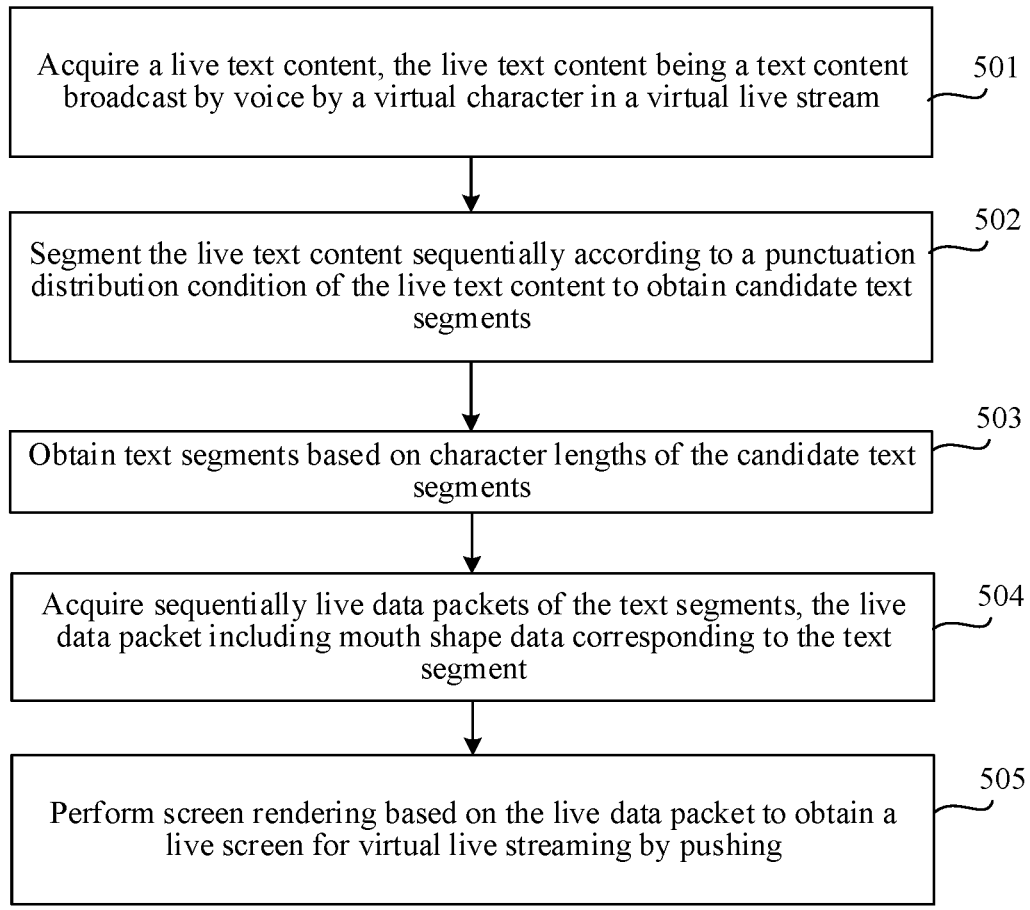
FIG. 5 is a flowchart of a virtual live video streaming method according to another exemplary embodiment of this application.

In an optional embodiment, length thresholds are set to implement the segmentation of the live text content. FIG. 5 is a flowchart of a virtual live video streaming method according to another exemplary embodiment of this application. The method is described with application to a server as an example. As shown in FIG. 5, the method includes the following steps:

Step 501: Acquire a live text content, the live text content being a text content broadcast by voice by a virtual character in a virtual live stream.

In some embodiments, the live text content is transmitted by an anchor terminal to the server in a virtual live streaming process.

Step 502: Segment the live text content sequentially according to a punctuation distribution condition of the live text content to obtain candidate text segments.

A punctuation set D is preset in the server. When segmentation is performed to obtain a candidate text segment, segmentation is performed according to a phrasing punctuation in the punctuation set D. Schematically, the phrasing punctuation in the punctuation set D is matched with a punctuation in the live text content, and a position where there is the phrasing punctuation in the live text content is determined as a segmentation point for obtaining the candidate text segment.

Step 503: Obtain text segments based on character lengths of the candidate text segments.

In some embodiments, the candidate text segment is directly determined as the text segment in response to the character length of the candidate text segment reaching a first length threshold. In response to the character length of the candidate text segment not reaching the first length threshold, the candidate text segment is stored to a segment combination region, and the candidate text segment in the segment combination region is combined with a candidate text segment subsequently obtained by segmentation to obtain the text segment.

The candidate text segment in the segment combination region is combined with the candidate text segment subsequently obtained by segmentation to obtain a combined candidate segment. The combined candidate segment is determined as the text segment in response to a character length of the combined candidate segment reaching a second length threshold. In response to the character length of the combined candidate segment not reaching the second length threshold, the combined candidate segment is combined with a candidate text segment subsequently obtained by segmentation, and the segment combination region is cleared when a character length reaches the second length threshold.

Schematically, as an example scenario, the first length threshold is 10, and the second length threshold is 12. The live text content is segmented first according to the punctuation set D to obtain a candidate text segment a, a length of the candidate text segment a being 11. In such case, the candidate text segment a is directly determined as a text segment. After the candidate text segment a is obtained, the live text content is segmented to obtain a candidate text segment b, a text length of the candidate text segment b being 5. In such case, the candidate text segment b is added to a segment combination region, and the live text content continues to be segmented to obtain a candidate text segment c, a text length of the candidate text segment c being 10. However, there is the candidate text segment b stored in the segment combination region before the candidate text segment c, so the candidate text segment b is combined with the candidate text segment c to obtain a text segment whose length is 15. As the length reaches the second length threshold, in this case, candidate text segments b and c may form another text segment.

In the above-mentioned embodiment, descriptions are made taking the text length of the candidate text segment c being 10 as an example. In another optional embodiment, if the text length of the candidate text segment c is 5, the text segment obtained by combining the candidate text segment b and the candidate text segment c does not reach the second length threshold. In such case, the live text content continues to be segmented to obtain a candidate text segment d, a text length of the candidate text segment d being 6. The candidate text segment b, the candidate text segment c, and the candidate text segment d are combined to obtain a text segment whose length is 16.

In some embodiments, the first length threshold and the second length threshold may or may not be equal. In this embodiment, descriptions are made taking the first length threshold and the second length threshold being not equal as an example.

Optionally, each of the first length threshold and the second length threshold corresponds to a preset initial length threshold. The first length threshold and the second threshold are length thresholds obtained by adjusting the initial length thresholds according to a segmentation condition of text segments. Schematically, every time when a text segment is successfully obtained by segmentation, a preset numerical value is added to the initial length thresholds to obtain an updated first length threshold and second length threshold. Schematically, the initial length threshold is 60, and 10 is iteratively added to the initial length threshold every time when a text segment is obtained by segmentation.

With respect to the above-mentioned candidate text segment subsequently obtained by segmentation, a candidate text segment after a current candidate text segment is obtained by segmentation and combined with a candidate text segment in the segment combination region, and then whether to store a combined candidate segment to the segment combination region is determined.

Schematically, the candidate text segment is obtained by the following segmentation process.

Step 1.1: Set an initial text segmentation length threshold S to 60 first to represent that a segmented phrase whose length is less than S is not determined as an independent text segment but combined with a next candidate text segment, set a punctuation set D, set an original live text content T, and set a segment combination region Th to null.

Step 1.2: Segment the live text content T from a starting character taking a phrasing punctuation in the punctuation set D as a segmentation point to obtain a candidate text segment, combine the candidate text segment with Th to obtain Ts, and determine whether a length of Ts is greater than S; and if the length is greater than S, perform step 1.3, otherwise perform step 1.4.

Step 1.3: Submit Ts to TTS service when Ts is successfully obtained by segmentation, update the live text content T as a remaining live text content to be phrased, set Th to null, update S to S+10, and perform step 1.5.

Step 1.4: Update Th to Ts when Ts fails to be obtained by segmentation, and update the live text content T as a remaining live text content to be phrased.

Step 1.5: Determine whether T is null; perform step 1.2 when T is not null; determine whether Th is null when T is null; if YES, end phrasing; and if NO, submit Th to the TTS service as a last phrasing, and end phrasing.

Step 504: Acquire sequentially live data packets of the text segments, the live data packet including mouth shape data corresponding to the text segment.

The mouth shape data is used for determining a mouth shape of the virtual character when the live text content is broadcast. The live data packets of the text segments are acquired sequentially. That is, the text segments obtained by segmenting the live text content are sequentially arranged, so the live data packets are sequentially acquired according to the arrangement sequence of the text segments when the live data packets are acquired.

Optionally, the mouth shape data in the live data packet is determined according to a pronunciation of a character in the text segment. Taking Chinese character as an example, mouth shape data corresponding to a character is determined in at least one of the following manners.

In a first manner, mouth shape data corresponding to each pronunciation is prestored. Four tones corresponding to the same pronunciation correspond to the same mouth shape, so it is only necessary to set corresponding mouth shape data for different pronunciations without considering the tone. After a pronunciation of the character is determined, the mouth shape data corresponding to the character may be determined. The pronunciation of the character may be determined according to a Pinyin expression of the character.

In a second manner, first mouth shape data corresponding to each vowel and second mouth shape data corresponding to each consonant are prestored. For the character in the text segment, a target vowel corresponding to the character and a target consonant corresponding to the character are determined, and the first mouth shape data corresponding to the target vowel is combined with the second mouth shape data corresponding to the target consonant to obtain the mouth shape data corresponding to the character.

In a third manner, there is such a case that different pronunciations correspond to the same mouth shape. For example, character "Ru" and character "Hu" are different in pronunciation but substantially the same in mouth shape. In such case, multiple pieces of specified mouth shape data are set, and an association relationship is established between each pronunciation and the correspondingly matched mouth shape data in the specified mouth shape data. Therefore, mouth shape data corresponding to each pronunciation is determined according to the association relationship. The pronunciation of the character may be determined by a Pinyin expression of the character.

The above manners for determining the mouth shape data are only schematic examples. No limits are made thereto in this embodiment of this application.

Step 505: Perform screen rendering based on the live data packet to obtain a live screen for virtual live streaming, the virtual live streaming may be implemented by pushing.

The live screen includes the virtual character who expresses the text segment with the mouth shape representation.

Optionally, three-dimensional rendering is performed on the mouth shape data in the live data packet to obtain a face image of the virtual character corresponding to the mouth shape data, a mouth shape representation of the virtual character in the face image being consistent with the mouth shape data. The face image is synthesized to a background image of the virtual live stream to generate the live screen for virtual live streaming. The virtual live streaming may be implemented by pushing, and may be pushed to, for example, players, or codec applications, and the like.

The mouth shape data is rendered to a three-dimensional face model of the virtual character to obtain the face image corresponding to the virtual character.

That is, a mouth shape representation on the three-dimensional face model of the virtual character is adjusted according to the mouth shape data, an appearance represented by the three-dimensional face model corresponding to the mouth shape data is collected, and an image corresponding to the appearance is acquired as the face image of the virtual character corresponding to the mouth shape data.

Optionally, three-dimensional face model data of the virtual character is stored in the server. When the mouth shape data is rendered, the three-dimensional face model data of the virtual character is acquired, and the mouth shape data is combined with the three-dimensional face model data to obtain a mouth shape of the three-dimensional face model when the live text content is broadcast. In some embodiments, the server needs to render the three-dimensional face model by combining expression data and mouth shape data of the virtual character to finally obtain the face image of the virtual character.

When the mouth shape data is combined with the three-dimensional face model data, the mouth shape of the three-dimensional face model is adjusted according to the mouth shape data. Optionally, the three-dimensional face model includes face key points for controlling a face shape. In some embodiments, the number and positions of the face key points are preset, and the face key points include eye key points, nose key points, lip key points, eyebrow key points, contour key points, etc. The mouth shape data is used for adjusting the position of a specified face key point in the three-dimensional face model. Schematically, the mouth shape data mainly presents the mouth shape representation of the virtual character, so the mouth shape data includes position data of the lip key points in the three-dimensional face model, and the positions of the lip key points in the three-dimensional face model are adjusted according to the position data of the lip key points in the mouth shape data to obtain an adjusted lip shape.

In some embodiments, the eyebrows, the eyes, and the face contour may change in a speaking process, so the mouth shape data further include position data of the eye key points, the eyebrow key points, and the contour key points.

In some embodiments, each face key point corresponds to a key point identifier and position coordinate data. A position of each face key point after mouth shape adjustment is determined based on the key point identifiers and corresponding position coordinate data of key points whose positions need to be adjusted in the mouth shape data, so as to adjust the mouth shape representation on the three-dimensional face model of the virtual character.

The above manner for adjusting the face key point is only an implementation mode of the mouth shape data. In some other embodiments, the mouth shape data may be implemented as a mouth shape image, and the mouth shape image is copied and pasted to a lip region of the three-dimensional face model, so as to implement mouth shape adjustment of the virtual character. In this embodiment of this application, a form of the mouth shape data and a manner for combining the mouth shape data and the three-dimensional face model data are not limited.

Figure 6:
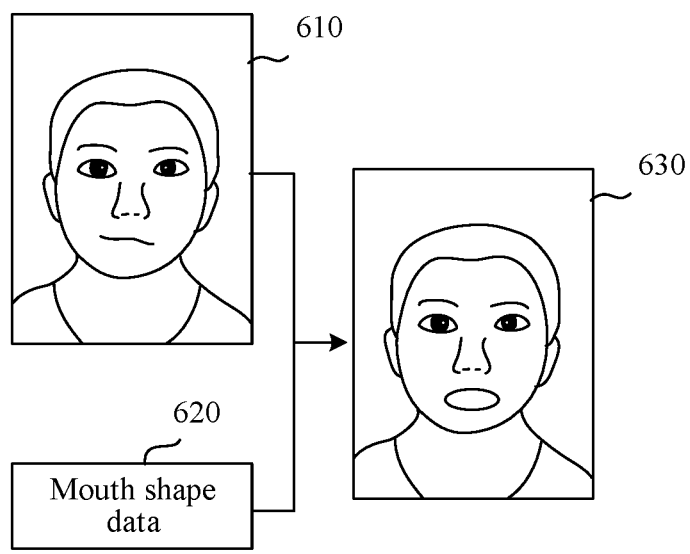
FIG. 6 is a schematic diagram of an expression rendering process based on the embodiment shown in FIG. 5.

Schematically, referring to FIG. 6, FIG. 6 is a schematic diagram of an expression rendering process according to an exemplary embodiment of this application. As shown in FIG. 6, a three-dimensional face model 610 of the virtual character is stored in the server. After mouth shape data 620 is acquired according to the live text content, the mouth shape data 620 is combined with the three-dimensional face model 610 to obtain a face image 630 of the virtual character when the live text content is broadcast.

Optionally, the virtual live video streaming system includes a 3D rendering module. The 3D rendering module renders the three-dimensional face model based on the mouth shape data to obtain a virtual character whose mouth shape representation is adjusted. The 3D rendering module may be implemented by open graphics library (OpenGL) and a convolutional neural network (CNN).

Rendering of the live screen based on the background image includes at least one of the following cases.

First: the background image includes a body movement of the virtual character and environmental background information. That is, body movements of the virtual character are combined in advance with the environmental background information to obtain multiple sets of different background images. A video length currently to be rendered is determined according to a client request text. That is, a length of a video segment is determined each time according to the text segment. Therefore, n sets of proper background images are selected from the prestored universal background images to be matched and synthesized with a face image, and display positions corresponding to the body movements in the background images are covered with the face image to obtain the live screen. Each set of background images complete a movement, and the n sets of background images may just complete n movements at the end of the video, n being a positive integer.

Second: the background image is used for representing environmental background information of the virtual live stream. After a video length currently to be rendered is determined, a background image for current rendering is determined from existing background images based on the video length, a body movement for current rendering is determined from existing body movements according to a content of the text segment, and the face image of the virtual character, the background image, and the body movement are combined for rendering to obtain the live screen. The background image is overlaid with the face image and the body movement to obtain a change of the virtual character in the environmental background.

The above implementations of the background image are only schematic examples. No limits are made thereto in this embodiment of this application.

In summary, according to the virtual live video streaming method provided in this embodiment, a long live text content is segmented into multiple short text segments, then live data packets of the multiple short text segments are acquired sequentially, and rendering is performed sequentially according to the live data packets of the multiple short text segments to obtain a live screen. Therefore, the problem of relatively large delay of the live screen caused by relatively high time consumption and relatively high complexity of acquisition and rendering processes of a live data packet of a long text is solved. Since TTS processing, rendering, and pushing are performed serially, the response of a live video is quickened, and the real-time performance of the live video is improved.

According to the method provided in this embodiment, length thresholds are set to segment the live text content to obtain multiple text segments, and lengths of the text segments are controlled according to the length thresholds. Therefore, the problem of relatively poor segmentation effects in case of obtaining too long text segments by segmentation or more data interactions in case of obtaining too short text segments by segmentation due to nonuniform segmentation of the text segments is solved, and the text segmentation efficiency and accuracy are improved.

Figure 7:
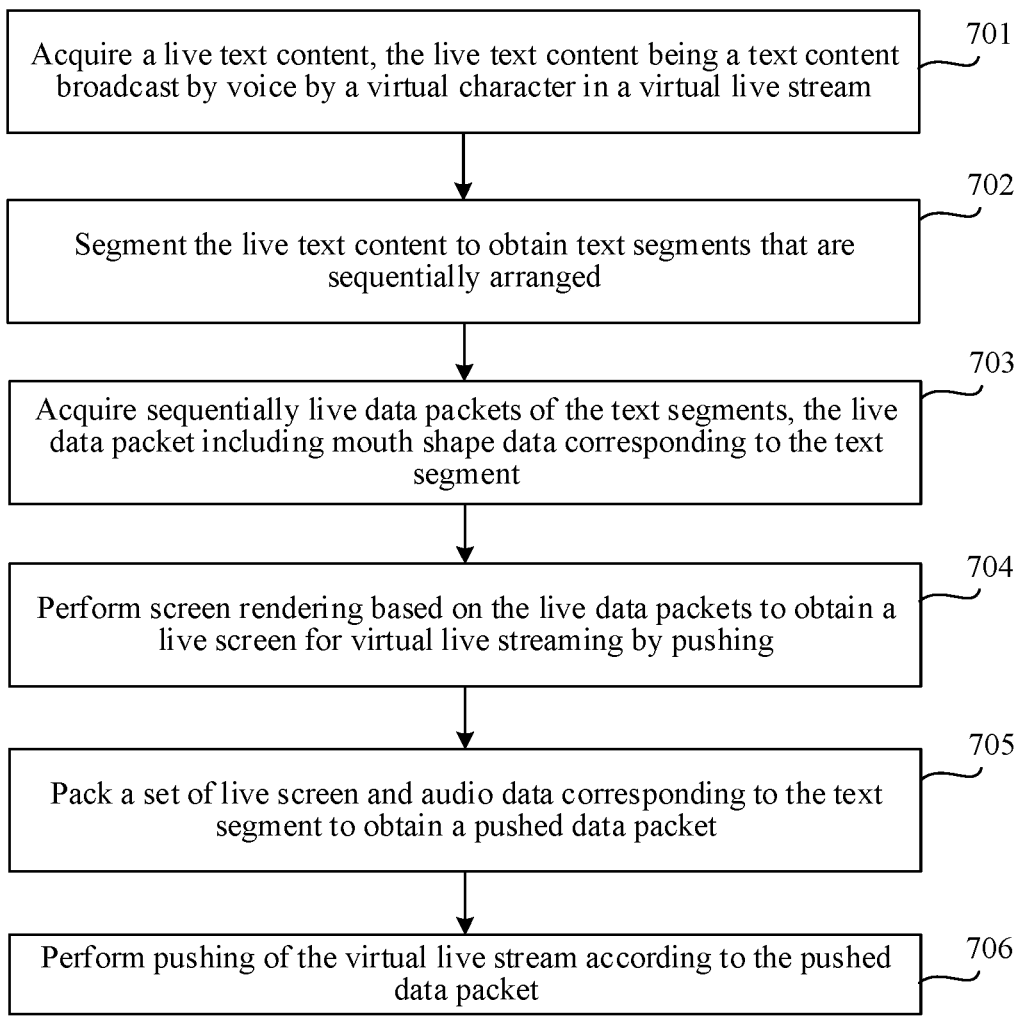
FIG. 7 is a flowchart of a virtual live video streaming method according to another exemplary embodiment of this application.

In some embodiments, the live data packet further includes audio data. FIG. 7 is a flowchart of a virtual live video streaming method according to another exemplary embodiment of this application. The method is described with application to a server as an example. As shown in FIG. 7, the method includes the following steps:

Step 701: Acquire a live text content, the live text content being a text content broadcast by voice by a virtual character in a virtual live stream.

In some embodiments, the live text content is transmitted by an anchor terminal to the server in a virtual live streaming process.

Step 702: Segment the live text content to obtain text segments that are sequentially arranged.

In order to avoid the impact of a long text on the response speed of the video, the server segments the live text content into multiple short texts.

In some embodiments, the server segments the live text content according to a character sequence in the live text content to obtain multiple text segments that are sequentially arranged. Optionally, when the live text content is segmented, the live text content is segmented sequentially according to a punctuation distribution condition of the live text content to obtain a candidate text segment, and the text segment is obtained according to a character length of the candidate text segment.

Step 703: Acquire sequentially live data packets of the text segments, the live data packet including mouth shape data corresponding to the text segment.

The mouth shape data is used for determining a mouth shape representation of the virtual character corresponding to the text segment. The live data packets of the text segments are acquired sequentially. That is, the text segments obtained by segmenting the live text content are sequentially arranged, so the live data packets are sequentially acquired according to an arrangement sequence of the text segments when the live data packets are acquired.

Optionally, the live data packet further includes audio data corresponding to the text segment, and the audio data is data obtained by TTS service by performing text to speech processing on the text segment.

In some embodiments, a virtual live video streaming system includes virtual video pushing service and TTS service. The virtual video pushing service segments the live text content into multiple text segments that are sequentially arranged, and then sequentially transmits the text segments to the TTS service to acquire live data packets. The virtual video pushing service transmits a text segment to the TTS service, and after the TTS service feeds back a live data packet, continues to transmit the next text segment to the TTS service.

Schematically, an $i^{th}$ text segment is transmitted to a text to speech server, i being a positive integer. The live data packet fed back by the text to speech server by streaming and corresponding to the $i^{th}$ text segment is received. An $(i+1)^{th}$ text segment is transmitted to the text to speech server in response to completely receiving the live data packet of the $i^{th}$ text segment.

Step 704: Perform screen rendering based on the live data packet to obtain a live screen for virtual live streaming. The virtual live streaming may be implemented by pushing, and may be pushed to, for example, players, or codec applications, and the like.

The live data packet includes the mouth shape data corresponding to the text segment, so that a mouth shape of the virtual character is rendered based on the mouth shape data to obtain the live screen.

In some embodiments, the virtual video pushing service further includes a 3D rendering module. A TTS request module transmits the mouth shape data to the 3D rendering module after receiving the live data packet fed back by the TTS service, such that the 3D rendering module performs 3D rendering processing by combining a three-dimensional model of the virtual character to obtain an expression image of the virtual character as the live screen.

Step 705: Pack a set of live screen and audio data corresponding to the text segment to obtain a pushed data packet.

Optionally, the video pushing module mainly performs video pushing by use of ffmpeg. When a first pushed data packet is received, ffmpeg-based pushing is initialized, and an audio and video is pushed. When an ending packet is received, ffmpeg-based pushing is ended, to complete entire video pushing.

Step 706: Perform pushing of the virtual live stream according to the pushed data packet.

Optionally, every time when acquiring a pushed data packet pushed by the 3D rendering module, the video pushing module extracts audio data and image frame data therefrom. The audio data and the image frame data are synchronously pushed to streaming media service by ffmpeg. After an ending packet is received, pushing of this video is ended.

Optionally, the virtual live video streaming server selects and transmits a proper streaming media server address to a live streaming client. The streaming media server address may be selected by using a fixed streaming media server address, or pre-allocating a selection range, etc. No limits are made thereto in this embodiment of this application.

In summary, according to the virtual live video streaming method provided in this embodiment, a long live text content is segmented into multiple short text segments, then live data packets of the multiple short text segments are acquired sequentially, and rendering is performed sequentially according to the live data packets of the multiple short text segments to obtain a live screen. Therefore, the problem of relatively large delay of the live screen caused by relatively high time consumption and relatively high complexity of acquisition and rendering processes of a live data packet of a long text is solved. Since TTS processing, rendering, and pushing are performed serially, the response of a live video is quickened, and the real-time performance of the live video is improved.

Figure 8:
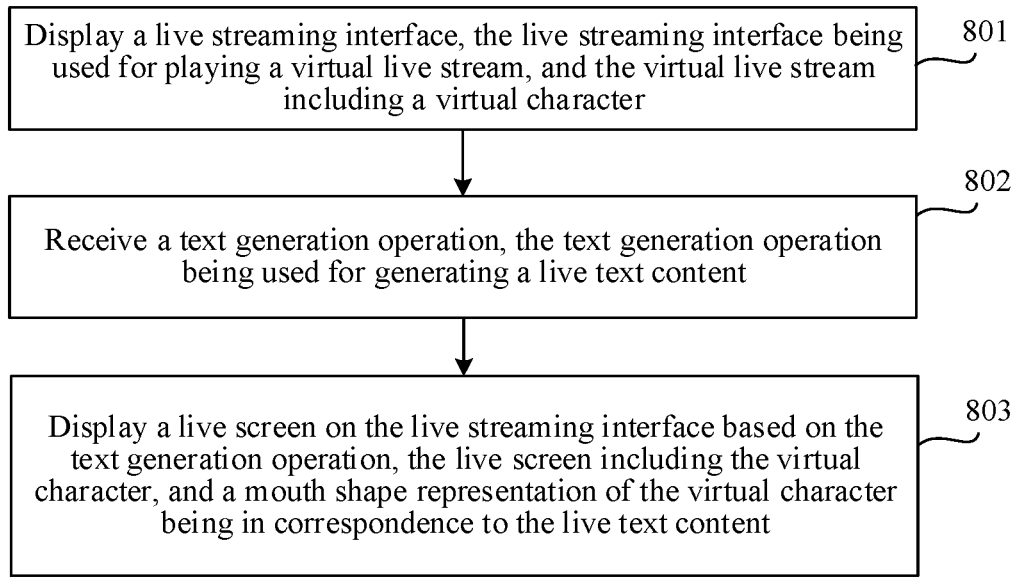
FIG. 8 is a flowchart of a virtual live video streaming method according to another exemplary embodiment of this application.

In the above-mentioned embodiment, descriptions are made with application of the virtual live video streaming method to a server as an example. In some embodiments, the live text content is generated in an anchor terminal or a relay terminal corresponding to an anchor. FIG. 8 is a flowchart of a virtual live video streaming method according to an exemplary embodiment of this application. Taking application of the method to a terminal as an example, as shown in FIG. 8, the method includes the following steps:

Step 801: Display a live streaming interface, the live streaming interface being used for playing a virtual live stream, and the virtual live stream including a virtual character.

In some embodiments, the live streaming interface is an interface displayed in the anchor terminal. Alternatively, the live streaming interface is an interface displayed in the relay terminal. The anchor terminal is an operating terminal of a subject content of the live stream. For example, when the virtual live stream is used for live game streaming, the anchor terminal is a terminal for operation in a game process, and the relay terminal is a terminal for managing the subject content of the live stream. That is, taking live game streaming as an example, the anchor terminal transmits a game process screen to the relay terminal, and the relay terminal relays the game process screen with additional commentating, and performs live stream pushing.

Step 802: Receive a text generation operation, the text generation operation being used for generating a live text content.

Optionally, the live text content is a text content broadcast by voice by the virtual character in the virtual live stream.

In some embodiments, the live text content is preset by the anchor and acquired from a stored text according to a text generation operation. Alternatively, the live text content is generated in real time.

Schematically, when the live text content is generated in real time, the live text content is generated in at least one of the following manners.

In a first manner, a text input operation is received as the text generation operation.

That is, a commentator directly edits the live text content in the anchor terminal according to a game process.

Schematically, in a live game streaming process, the commentator edits and transmits the live text content in real time to the server to generate a live commentating screen of the virtual character.

In a second manner, a voice input operation is received as the text generation operation, the voice input operation being used for receiving a voice input signal and converting the voice input signal into the live text content.

That is, a commentator inputs a voice content through a microphone connected with the anchor terminal, and the anchor terminal performs speech to text processing on the voice content to obtain the live text content.

Schematically, in a game commentating process, the commentator inputs a real-time voice content according to a game screen, performs speech to text processing on the real-time voice content in the anchor terminal to obtain the live text content, and transmits the live text content to the server to generate a live commentating screen of the virtual character.

In a third manner, a text shortcut operation is received as the text generation operation, the text shortcut operation being a preset operation mode, and a corresponding live text content being preset for the text shortcut operation.

That is, a commentary content is generated automatically according to a key operation in the game process, and a commentator adjusts the automatically generated commentary content to generate the live text content.

Schematically, the key operation includes at least one of the following cases. 1: In the live game streaming process, multiple preset shortcut controls are displayed on the interface of the anchor terminal, each shortcut control corresponding to a piece of preset commentary content. 2: An interface display element in the game process is monitored, or background data in the game process is monitored, or an operation of a player in the game process is monitored, and a corresponding commentary content is generated automatically according to a key operation in a monitoring result. For example, the above key operations are only schematic examples. No limits are made thereto in this embodiment of this application.

Step 803: Display a live screen on the live streaming interface based on the text generation operation, the live screen including the virtual character, and a mouth shape representation of the virtual character corresponding to the live text content.

Optionally, a live screen for previewing is displayed based on the live text content generated by the text generation operation, the live screen including the virtual character who expresses the live text content with a mouth shape. The mouth shape representation is implemented according to the mouth shape data in the above-mentioned embodiment.

In the above-mentioned embodiment, descriptions are made taking the server generating the live screen according to the live text content as an example. In some embodiments, after generating a live text content, the terminal directly segments the live text content to obtain text segments, and sequentially acquires live data packets of the live text segments, so as to obtain a live screen by rendering. That is, the process of generating the live screen according to the live text content is directly performed by the terminal after generating the live text content. The specific process of generating the live screen by the terminal may refer to the above-mentioned process of generating the live screen by the server, and will not be elaborated herein.

In summary, according to the virtual live video streaming method provided in this embodiment, a live text content is generated in a live streaming process, and then a virtual character broadcasts the live text content in a virtual live stream displayed in the terminal. The virtual character implements broadcasting with a mouth shape representation corresponding to the live text content. Therefore, the real-time performance of virtual live streaming and the representation trueness are improved, and the virtual live streaming effect is improved.

Figure 9:
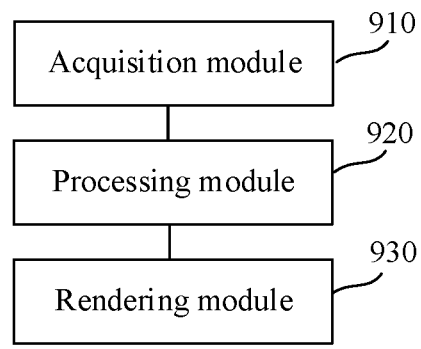
FIG. 9 is a structural block diagram of a virtual live video streaming apparatus according to an exemplary embodiment of this application.

FIG. 9 is a structural block diagram of a virtual live video streaming apparatus according to an exemplary embodiment of this application. In this disclosure, a unit and a module may be hardware such as a combination of electronic circuitries; firmware; or software such as computer instructions. The unit and the module may also be any combination of hardware, firmware, and software. In some implementation, a unit may include at least one module. As shown in FIG. 9, the apparatus includes:

an acquisition module 910, configured to acquire a live text content, the live text content being a text content broadcast by voice by a virtual character in a virtual live stream;

a processing module 920, configured to segment the live text content to obtain text segments that are sequentially arranged, the acquisition module 910 being further configured to acquire sequentially live data packets of the text segments, the live data packet including mouth shape data corresponding to the text segment, and the mouth shape data being used for determining a mouth shape representation of the virtual character corresponding to the text segment; and a rendering module 930, configured to perform screen rendering based on the live data packet to obtain a live screen for virtual live streaming by pushing, the live screen including the virtual character who expresses the text segment with the mouth shape representation.

In an optional embodiment, the processing module 920 is further configured to segment the live text content sequentially taking a punctuation in the live text content as a segmentation point to obtain a candidate text segment; and obtain the text segment based on a character length of the candidate text segment.

In an optional embodiment, the acquisition module 910 is further configured to acquire a punctuation set, the punctuation set including a preset phrasing punctuation used as a segmentation point.

The processing module 920 is further configured to segment the live text content sequentially taking the phrasing punctuation in the live text content as the segmentation point to obtain the candidate text segment.

Figure 10:
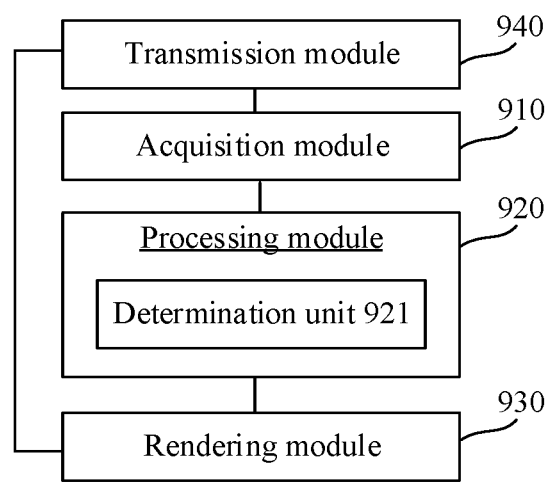
FIG. 10 is a structural block diagram of a virtual live video streaming apparatus according to another exemplary embodiment of this application.

In an optional embodiment, as shown in FIG. 10, the processing module 920 includes:

a determination unit 921, configured to determine the candidate text segment directly as the text segment in response to the character length of the candidate text segment reaching a first length threshold.

The determination unit 921 is further configured to store, in response to the character length of the candidate text segment not reaching the first length threshold, the candidate text segment to a segment combination region, and combine the candidate text segment in the segment combination region and a candidate text segment subsequently obtained by segmentation to obtain the text segment.

In an optional embodiment, the determination unit 921 is further configured to combine the candidate text segment in the segment combination region and the candidate text segment subsequently obtained by segmentation to obtain a combined candidate segment.

The determination unit 921 is further configured to determine the combined candidate segment as the text segment in response to a character length of the combined candidate segment reaching a second length threshold.

The determination unit 921 is further configured to combine, in response to the character length of the combined candidate segment not reaching the second length threshold, the combined candidate segment and a candidate text segment subsequently obtained by segmentation, and clear the segment combination region when a character length reaches the second length threshold.

In an optional embodiment, the rendering module 930 is further configured to perform three-dimensional rendering on the mouth shape data in the live data packet to obtain a face image corresponding to the virtual character; and synthesize the face image to a background image of the virtual live stream to generate the live screen for virtual live streaming. The virtual live streaming may be implemented by pushing, and may be pushed to, for example, players, or codec applications, and the like.

In an optional embodiment, the rendering module 930 is further configured to render the mouth shape data to a three-dimensional face model of the virtual character to obtain the face image corresponding to the virtual character.

In an optional embodiment, the apparatus further includes:
- a transmission module 940, configured to transmit an $i^{th}$ text segment to a text to speech server, i being a positive integer.

The acquisition module 910 is further configured to receive the live data packet fed back by the text to speech server by streaming and corresponding to the $i^{th}$ text segment.

The transmission module 940 is further configured to transmit an $(i+1)^{th}$ text segment to the text to speech server in response to completely receiving the live data packet of the $i^{th}$ text segment.

In an optional embodiment, the live data packet further includes audio data corresponding to the text segment.

The apparatus further includes:
- a transmission module 940, configured to pack a set of live screen corresponding to the text segment and the audio data to obtain a pushed data packet, and perform pushing of the virtual live stream according to the pushed data packet.

In an optional embodiment, this application also provides a virtual live video streaming apparatus, including:
- a display module, configured to display a live streaming interface, the live streaming interface being used for playing a virtual live stream, and the virtual live stream including a virtual character; and
- a receiving module, configured to receive a text generation operation, the text generation operation being used for generating a live text content, and the live text content being a text content broadcast by voice by the virtual character in the virtual live stream,
- the display module being further configured to display a live screen on the live streaming interface based on the text generation operation, the live screen including the virtual character, and a mouth shape representation of the virtual character corresponding to the live text content.

Optionally, the receiving module is further configured to receive a text input operation as the text generation operation;
or,
the receiving module is further configured to receive a text shortcut operation as the text generation operation, the text shortcut operation being a preset operation mode, and a corresponding live text content being preset for the text shortcut operation;
or,
the receiving module is further configured to receive a voice input operation as the text generation operation, the voice input operation being used for receiving a voice input signal and converting the voice input signal into the live text content.

Optionally, the display module is further configured to transmit the live text content to a server based on the text generation operation; and receive the live screen fed back by the server based on the live text content, and display the live screen, the server segmenting the live text content to obtain text segments that are sequentially arranged, then acquiring sequentially live data packets of the text segments, and performing screen rendering based on the live data packet to obtain the live screen for virtual live streaming by pushing, the live data packet including mouth shape data corresponding to the text segment, and the mouth shape data being used for determining a mouth shape representation of the virtual character corresponding to the text segment.

Optionally, the display module is further configured to segment the live text content based on the text generation operation to obtain text segments that are sequentially arranged; acquire sequentially live data packets of the text segments, the live data packet including mouth shape data corresponding to the text segment, and the mouth shape data being used for determining a mouth shape representation of the virtual character corresponding to the text segment; and perform screen rendering based on the live data packet to obtain a live screen for virtual live streaming by pushing, and display the live screen.

In summary, according to the virtual live video streaming apparatus provided in this embodiment, a long live text content is segmented into multiple short text segments, then live data packets of the multiple short text segments are acquired sequentially, and rendering is performed sequentially according to the live data packets of the multiple short text segments to obtain a live screen. Therefore, the problem of relatively large delay of the live screen caused by relatively high time consumption and relatively high complexity of acquisition and rendering processes of a live data packet of a long text is solved. Since TTS processing, rendering, and pushing are performed serially, the response of a live video is quickened, and the real-time performance of the live video is improved.

According to the virtual live video streaming apparatus in the above embodiment, only division of the functional modules is illustrated. In actual application, the functions may be assigned to different functional modules for completion as required. In other words, an internal structure of the device is divided into different functional modules to complete all or a part of the functions described above. In addition, the virtual live video streaming apparatus and the virtual live video streaming method embodiments provided in the foregoing embodiments belong to one conception. For the specific implementation process, refer to the method embodiments, and details are not described herein again.

Figure 11:
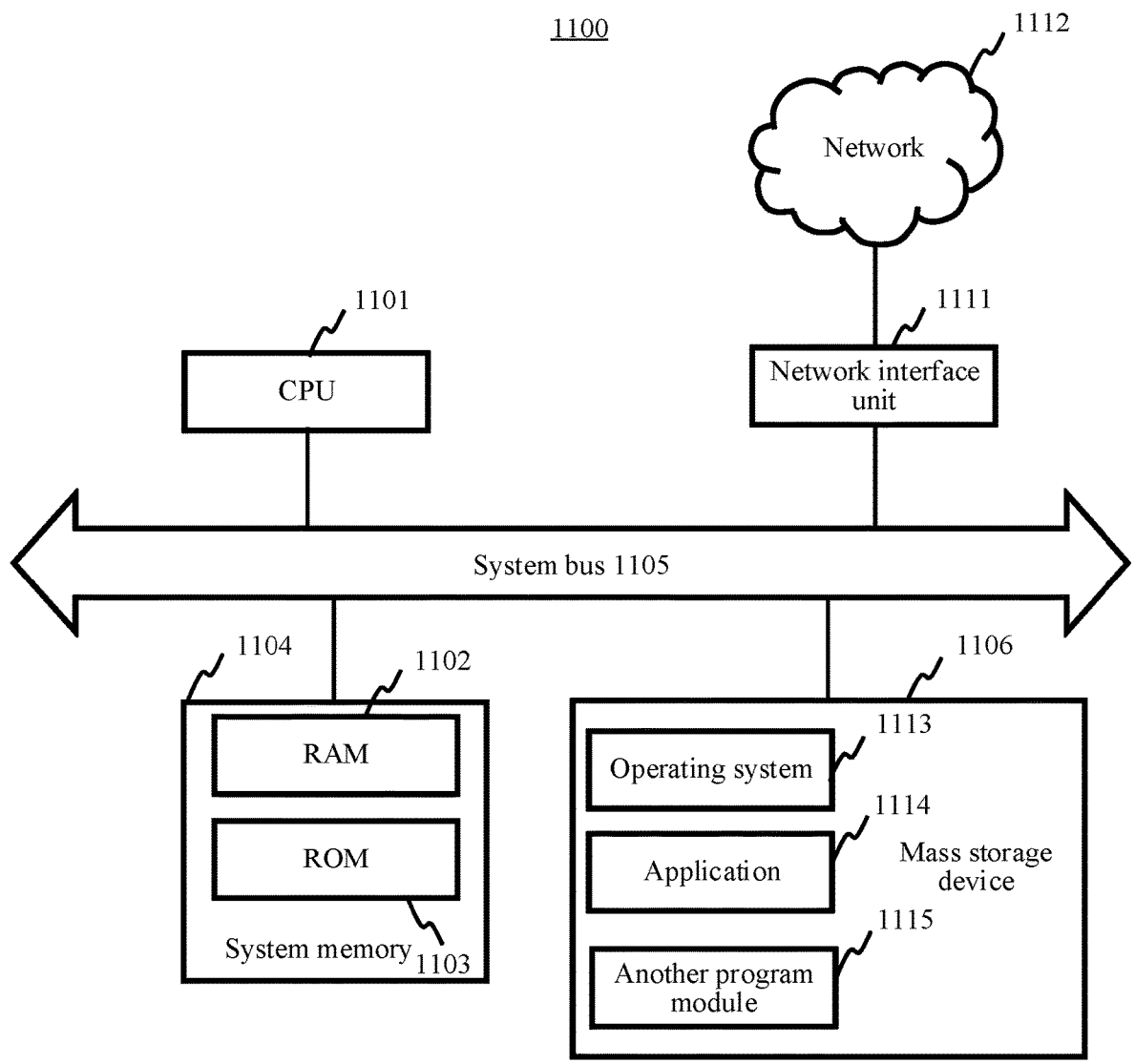
FIG. 11 is a structural block diagram of a server according to an exemplary embodiment of this application.

FIG. 11 is a schematic structural diagram of a server according to an exemplary embodiment of this application. Specifically, The server 1100 includes a central processing unit (CPU) 1101, a system memory 1104 including a random access memory (RAM) 1102 and a read-only memory (ROM) 1103, and a system bus 1105 connecting the system memory 1104 to the CPU 1101. The server 1100 further includes a high-capacity storage device 1106 configured to store an operating system 1113, an application 1114, and another program module 1115.

The mass storage device 1106 is connected to the CPU 1101 by using a mass storage controller (not shown) connected to the system bus 1105. The mass storage device 1106 and a computer-readable medium associated with the mass storage device 1306 provide non-volatile storage for the server 1100. That is, the mass storage device 1106 may include a computer-readable medium (not shown) such as a hard disk or a compact disc read only memory (CD-ROM) drive.

In general, the non-transitory computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, a person skilled in the art may know that the computer storage medium is not limited to the foregoing types. The system memory 1104 and the mass storage device 1106 may be collectively referred to as a memory.

According to various embodiments of this disclosure, the server 1100 may further be connected, by using a network such as the Internet, to a remote computer on the network and run. That is, the server 1100 may be connected to a network 1112 by using a network interface unit 1111 that is connected to the system bus 1105, or may be connected to a network of another type or a remote computer system (not shown) by using the network interface unit 1111.

The memory further includes one or more programs, which are stored in the memory and are configured to be executed by the CPU.

An embodiment of this application further provides a computer device, the computer device including a processor and a memory, the memory storing at least one instruction, at least one segment of program, a code set, or an instruction set, the at least one instruction, the at least one segment of program, the code set, or the instruction set being loaded and executed by the processor to implement the virtual live video streaming method provided in the foregoing method embodiments.

An embodiment of this application further provides a non-transitory computer-readable storage medium, the non-transitory computer-readable storage medium storing at least one instruction, at least one segment of program, a code set, or an instruction set, the at least one instruction, the at least one segment of program, the code set, or the instruction set being loaded and executed by the processor to implement the virtual live video streaming method provided in the foregoing method embodiments.

An embodiment of this application further provides a computer program product or a computer program. The computer program product or the computer program includes a computer instruction. The computer instruction is stored in a non-transitory computer-readable storage medium. A processor of a computer device reads the computer instructions from the non-transitory computer-readable storage medium, and executes the computer instructions, to cause the computer device to implement the foregoing virtual live video streaming method according to any one of the foregoing embodiments of this disclosure.

A person of ordinary skill in the art may understand that all or some of the steps of the foregoing embodiments may be implemented by hardware, or may be implemented by a program instructing relevant hardware. The program may be stored in a non-transitory computer-readable storage medium. The storage medium may be a read-only memory, a magnetic disk, an optical disc, or the like.

The foregoing descriptions are merely optional embodiments of this disclosure, but are not intended to limit this application. Any modification, equivalent replacement, or improvement made within the spirit and principle of this application shall fall within the protection scope of this application.

What is claimed is:

1. A method for virtual live streaming, applied to a computer device, the method comprising:
    acquiring a live text content, the live text content being a text content broadcast by voice by a virtual character in a virtual live stream;
    segmenting the live text content to obtain text segments that are sequentially arranged;
    acquiring a live broadcast data packet of each of the text segments following a sequence of the text segments, the live broadcast data packet comprising mouth shape data corresponding to the each of the text segments, and the mouth shape data being used for determining a mouth shape of the virtual character corresponding to the text segment; and
    performing screen rendering based on the live broadcast data packet to obtain a live screen for the virtual live streaming, the live screen comprising the virtual character who expresses the each of the text segments with the corresponding mouth shape.

2. The method according to claim 1, wherein segmenting the live text content to obtain the text segments comprises:
    segmenting the live text content sequentially using punctuations in the live text content as delimiters to obtain candidate text segments; and
    obtaining the text segments based on a character length of each of the candidate text segments.

3. The method according to claim 2, wherein segmenting the live text content sequentially using the punctuations in the live text content as the delimiters to obtain the candidate text segments comprises:
    acquiring a punctuation set, the punctuation set comprising preset phrasing punctuations used as delimiters; and
    segmenting the live text content sequentially using the phrasing punctuations in the live text content as the delimiters to obtain the candidate text segments.

4. The method according to claim 2, wherein obtaining the text segments based on the character length of the each of the candidate text segments comprises:
    determining the each of the candidate text segments directly as a text segment in response to the character length of the each of the candidate text segments reaching a first threshold; and
    in response to the character length of the each of the candidate text segments not reaching the first threshold, combining the each of the candidate text segments and a subsequently obtained candidate text segment, to obtain a text segment.

5. The method according to claim 4, wherein the combining the each of the candidate text segments and the subsequently obtained candidate text segment, to obtain the text segment comprises:
    combining the each of the candidate text segments and the subsequently obtained candidate text segment obtain a combined candidate segment;
    determining the combined candidate segment as the text segment in response to a character length of the combined candidate segment reaching a second threshold; and
    in response to the character length of the combined candidate segment not reaching the second threshold, successively combining the combined candidate segment and a subsequently obtained candidate text segment to obtain an updated combined candidate segment, until a character length of the updated combined candidate segment reaches the second threshold.

6. The method according to claim 1, wherein performing screen rendering based on the live broadcast data packet to obtain the live screen for the virtual live streaming comprises:
performing three-dimensional rendering on the mouth shape data in the live broadcast data packet to obtain a face image corresponding to the virtual character; and
synthesizing the face image to a background image of the virtual live streaming to generate the live screen.

7. The method according to claim 6, wherein performing the three-dimensional rendering on the mouth shape data in the live broadcast data packets to obtain the face image corresponding to the virtual character comprises:
rendering the mouth shape data to a three-dimensional face model of the virtual character to obtain the face image corresponding to the virtual character.

8. The method according to claim 1, wherein acquiring the live broadcast data packet of the each of the text segments comprises:
transmitting an $i^{th}$ text segment to a text-to-speech server, i being a positive integer;
receiving the live broadcast data packet fed back by the text-to-speech server corresponding to the $i^{th}$ text segment; and
transmitting an $(i+1)^{th}$ text segment to the text-to-speech server in response to completely receiving the live data packet of the $i^{th}$ text segment.

9. The method according to claim 1, wherein:
the live broadcast data packet further comprises audio data corresponding to the text segment; and
after performing screen rendering based on the live broadcast data packet to obtain the live screen for virtual live streaming, the method further comprises:
packing a set of live screens corresponding to the text segment and the audio data to obtain a video stream data packet, and
pushing the virtual live streaming according to the video stream data packet.

10. A method for virtual live video streaming, applied to a computer device, the method comprising:
displaying a live streaming interface, the live streaming interface being used for playing a virtual live video stream, and the virtual live video stream comprising a virtual character;
receiving a text generation operation, the text generation operation being used for generating a live text content, and the live text content being a text content broadcast by voice by the virtual character in the virtual live stream; and
displaying a live screen on the live streaming interface based on the text generation operation, the live screen comprising the virtual character, and a mouth shape representation of the virtual character corresponding to the live text content.

11. The method according to claim 10, wherein receiving the text generation operation comprises at least one of:
receiving a text input operation as the text generation operation;
receiving a text shortcut operation as the text generation operation, the text shortcut operation being a preset operation, and a corresponding live text content being preset for the text shortcut operation; or
receiving a voice input operation as the text generation operation, the voice input operation being used for receiving a voice input signal and converting the voice input signal into the live text content.

12. The method according to claim 10, wherein displaying the live screen on the live streaming interface based on the text generation operation comprises:
transmitting the live text content to a server based on the text generation operation; and
receiving the live screen fed back by the server based on the live text content, and displaying the live screen, wherein a reception live text content by the server triggers the server to:
segment the live text content to obtain text segments that are sequentially arranged;
acquire a live broadcast data packet of each of the text segments following a sequence of the text segments; and
perform screen rendering based on the live data packet to obtain the live screen for virtual live streaming, the live broadcast data packet comprising mouth shape data corresponding to the each of the text segments, and the mouth shape data being used for determining a mouth shape of the virtual character corresponding to the text segment.

13. The method according to claim 10, wherein displaying the live screen on the live streaming interface based on the text generation operation comprises:
segmenting the live text content based on the text generation operation to obtain text segments that are sequentially arranged;
acquiring a live broadcast data packet of each of the text segments following a sequence of the text segments, the live broadcast data packet comprising mouth shape data corresponding to the each of the text segments, and the mouth shape data being used for determining a mouth shape of the virtual character corresponding to the text segment; and
performing the screen rendering based on the live data packet to obtain the live screen for virtual live streaming, and displaying the live screen.

14. A device for virtual live streaming, the device comprising a memory for storing computer instructions and a processor in communication with the memory, wherein, when the processor executes the computer instructions, the processor is configured to cause the device to:
acquire a live text content, the live text content being a text content broadcast by voice by a virtual character in a virtual live stream;
segment the live text content to obtain text segments that are sequentially arranged;
acquire a live broadcast data packet of each of the text segments following a sequence of the text segments, the live broadcast data packet comprising mouth shape data corresponding to the each of the text segments, and the mouth shape data being used for determining a mouth shape of the virtual character corresponding to the text segment; and
perform screen rendering based on the live broadcast data packet to obtain a live screen for the virtual live streaming, the live screen comprising the virtual character who expresses the each of the text segments with the corresponding mouth shape.

15. The device according to claim 14, wherein, when the processor is configured to cause the device to segment the live text content to obtain the text segments, the processor is configured to cause the device to:

segment the live text content sequentially using punctuations in the live text content as delimiters to obtain candidate text segments; and obtain the text segments based on a character length of each of the candidate text segments.

16. The device according to claim 15, wherein, when the processor is configured to cause the device to segment the live text content sequentially using the punctuations in the live text content as the delimiters to obtain the candidate text segments, the processor is configured to cause the device to:

acquire a punctuation set, the punctuation set comprising preset phrasing punctuations used as delimiters; and segment the live text content sequentially using the phrasing punctuations in the live text content as the delimiters to obtain the candidate text segments.

17. The device according to claim 15, wherein, when the processor is configured to cause the device to obtain the text segments based on the character length of the each of the candidate text segments, the processor is configured to cause the device to:

determine the each of the candidate text segments directly as a text segment in response to the character length of the each of the candidate text segments reaching a first threshold; and in response to the character length of the each of the candidate text segments not reaching the first threshold, combine the each of the candidate text segments and a subsequently obtained candidate text segment, to obtain a text segment.

18. The device according to claim 17, wherein, when the processor is configured to cause the device to combining the each of the candidate text segments and the subsequently obtained candidate text segment, to obtain the text segment, the processor is configured to cause the device to:

combine the each of the candidate text segment and the subsequently obtained candidate text segment obtain a combined candidate segment;

determine the combined candidate segment as the text segment in response to a character length of the combined candidate segment reaching a second threshold; and in response to the character length of the combined candidate segment not reaching the second threshold, successively combine the combined candidate segment and a subsequently obtained candidate text segment to obtain an updated combined candidate segment, until a character length of the updated combined candidate segment reaches the second threshold.

19. The device according to claim 14, wherein, when the processor is configured to cause the device to perform screen rendering based on the live broadcast data packet to obtain the live screen for the virtual live streaming, the processor is configured to cause the device to:

perform three-dimensional rendering on the mouth shape data in the live broadcast data packet to obtain a face image corresponding to the virtual character; and synthesize the face image to a background image of the virtual live streaming to generate the live screen.

20. The device according to claim 19, wherein, when the processor is configured to cause the device to perform the three-dimensional rendering on the mouth shape data in the live broadcast data packets to obtain the face image corresponding to the virtual character, the processor is configured to cause the device to:

render the mouth shape data to a three-dimensional face model of the virtual character to obtain the face image corresponding to the virtual character.

* * * * *